(12) United States Patent
Lau et al.

(10) Patent No.: US 7,471,481 B2
(45) Date of Patent: Dec. 30, 2008

(54) METHOD FOR ESTABLISHING AND MAINTAINING RADIAL POSITION FOR HARD DISK DRIVE SELF SERVO WRITE WITHOUT SEED WEDGES

(75) Inventors: King Wai Thomas Lau, Santa Clara, CA (US); Richard Koonwai Wong, San Jose, CA (US); Fatih Sarigoz, Milpitas, CA (US); Ara W. Nazarian, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 132 days.

(21) Appl. No.: 11/405,871

(22) Filed: Apr. 18, 2006

(65) Prior Publication Data
US 2007/0211367 A1 Sep. 13, 2007

Related U.S. Application Data

(60) Provisional application No. 60/780,784, filed on Mar. 8, 2006.

(51) Int. Cl.
*G11B 21/02* (2006.01)
*G11B 5/09* (2006.01)

(52) U.S. Cl. .......................................... 360/75; 360/51
(58) Field of Classification Search ........................ None
See application file for complete search history.

(56) References Cited

U.S. PATENT DOCUMENTS

| 5,668,679 | A | * | 9/1997 | Swearingen et al. | .......... 360/75 |
| 7,088,533 | B1 | * | 8/2006 | Shepherd et al. | .............. 360/51 |
| 2007/0165319 | A1 | * | 7/2007 | Fisher | .......................... 360/51 |

* cited by examiner

*Primary Examiner*—Andrew L. Sniezek
(74) *Attorney, Agent, or Firm*—Garlick Harrison & Markison

(57) ABSTRACT

Magnetic reference patterns may be generated on a disk or other magnetic media without the need for seed wedges. This involves writing a first magnetic reference pattern to the disk with a servo writer. The disk may then be transferred to a hard disk drive. Control circuitry within the hard disk drive may recognize the first magnetic reference pattern and then position a RW head within the hard disk drive based on the first magnetic reference pattern. As the RW drive is accurately positioned based on the first magnetic reference pattern a second magnetic reference pattern may be written to the disk using the RW head. The RW head location is determined based on the velocity and phase between the read-write head and spiral sync marks contained within the first magnetic reference pattern.

17 Claims, 13 Drawing Sheets

1,1,1,......,1,1,1,1,0,1,0,0,0,1,0,......,0,1,1,1,0,1,1,1,......,1,1,1,0,..

Non index "space":
40 1's + 1 0

Gray or Track Number:
32 1's or 0's

Non index "space":
40 1's + 1 0

1,1,1,1,1,......,1,1,1,1,0,1,0,0,0,1,0,......,0,1,1,1,0,1,1,1,......,1,1,1,0,..

Index "space":
41 1's + 1 0

Gray or Track Number:
32 1's or 0's

Non index "space":
40 1's + 1 0

FIG. 8

METHOD FOR ESTABLISHING AND MAINTAINING RADIAL POSITION FOR HARD DISK DRIVE SELF SERVO WRITE WITHOUT SEED WEDGES

CROSS REFERENCE TO RELATED PATENTS

This application incorporates by reference and claims priority under 35 USC § 119(e) to a provisionally filed patent application having the same title as the present patent application, a filing date of Mar. 8, 2006, and an application No. of 60/780,784.

TECHNICAL FIELD OF THE INVENTION

The present invention relates generally to writing reference patterns to magnetic media, and more particularly, a self servo writing process.

BACKGROUND OF THE INVENTION

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Typically, these tracks and sectors are created during the low level formatting of the disk. This low level formatting process creates the physical structures (tracks, sectors, control information) on the disk. Normally, this step begins with the hard disk platters containing no information. Newer disks use many complex internal structures, including zoned bit recording to put more sectors on the outer tracks than the inner ones, and embedded servo data to control the head actuator. Newer disks also transparently map out bad sectors. Due to this complexity, all modern hard disks are low-level formatted at the factory for the life of the drive.

This low level formatting is usually performed using external servo writers that write the physical structures to disk 10 during manufacturing. Accurate positioning of the physical structures is achieved within the external servo writer by accurately controlling the RW head position within the external servo writer. External servo writers, because of the high degree of positioning accuracy required, have become an expensive processing bottleneck during the hard disk drive manufacturing.

Self servo writing (SSW) attempts to overcome this expensive and time-consuming bottleneck. External servo writers write a first magnetic reference pattern (servo pattern) on the surface of the disk. The disk may then be assembled into a hard disk drive, where the low level formatting (LLF) is initially performed within the hard disk drive. In SSW, the LLF is completed within the hard disk drive without using additional external hardware. The LLF uses the servo pattern written by the external servo writer to create the physical structures on the disk.

SSW first has a servo-writer move the head at constant speed to write spirals from Inner Diameter (ID) to Outer Diamond (OD). The spirals are repeating patterns of sine wave bursts and spiral sync marks (SSM). The bursts are used to derive Position Error Signal (PES). The sync marks are used to derive timing to drive a Disk Lock Clock (DLC) system so that when it has locked, spirals are read and final servo patterns are written synchronously. Traditionally, servo-writer will write a certain number of tracks called seed wedges either in ID or OD so that track number and wedge number are established during startup.

Firmware then may keep track of track number and wedge number as the head is positioned. Any disturbance during the servo writing process when the head is not on seed wedges will result in loss of position information. The servo-writing process has to start all over again. Also, seed wedges are at least as long as the final servo pattern and could be longer to give better quality samples during startup. Using the servo-writer to write these seed wedges is costly as this process is done in a clean room where spirals are written. In addition, in order for SSW to work, the DLC is assumed to have acquired and locked to disk variations.

During most SSW processes, the position of the RW heads may drift from their targeted position. This drift may introduce a position error following completion of the SSW process. Further, since the position of each subsequent radial track may depend on the position of the previously written track, this position error can accumulate during the SSW process. Therefore, the accumulation of positioning errors should be addressed such that the position errors accumulated during the SSW process may be reduced or eliminated.

Further limitations and disadvantages of conventional and traditional SSW processes and related functionality will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 8 depicts adjacent tracks containing gray coded information in accordance with an embodiment of the present invention;

DETAILED DESCRIPTION OF THE INVENTION

Preferred embodiments of the present invention are illustrated in the FIGs., like numerals being used to refer to like and corresponding parts of the various drawings.

Embodiments of the present invention provide a system or method operable to locate and position a read-write (RW) head in order to enable self-servo writing (SSW) processes within a hard disk drive that substantially addresses the above-identified needs. A first embodiment of the present invention provides a method to generate magnetic reference patterns, such as sector and track patterns on magnetic media or disc. This involves writing a first magnetic reference pattern to the disk with a servo writer. The disk may be then transferred from the servo writer to a standard hard disk drive. This hard disk drive contains a disk controller that recognizes the first magnetic reference pattern and is operable to accurately locate and position the RW head of the hard disk drive based on velocity and phase errors between the RW head and servo setter marks within the first magnetic reference pattern. By accurately positioning the RW head, a second magnetic reference pattern that defines the physical structures (i.e. tracks and sectors) may be written to the disc.

Another embodiment of the present invention provides a hard disk drive that includes a disk controller, at least one RW head, and at least one disk or platter. This disk or platter initially contains only a first magnetic reference pattern. The disk controller locates and positions the RW head to write a second magnetic reference pattern to the disk wherein the disk controller locates and positions the RW head based on a velocity and phase difference between the RW head and SSMs within the first magnetic reference pattern.

By positioning the RW head using the velocity and phase error, the disk controller control the velocity and phase (i.e. location) of the RW head relative to the first magnetic reference pattern. This type of positioning reduces or eliminates accumulated position errors associated with prior SSW processes that accumulated position errors while performing the SSW process. The reduction or elimination of position errors results in a higher quality definition of physical structures (i.e. sectors and tracks) within the hard disk that may ultimately result in both lower product cost and high product yield.

Figure 2:
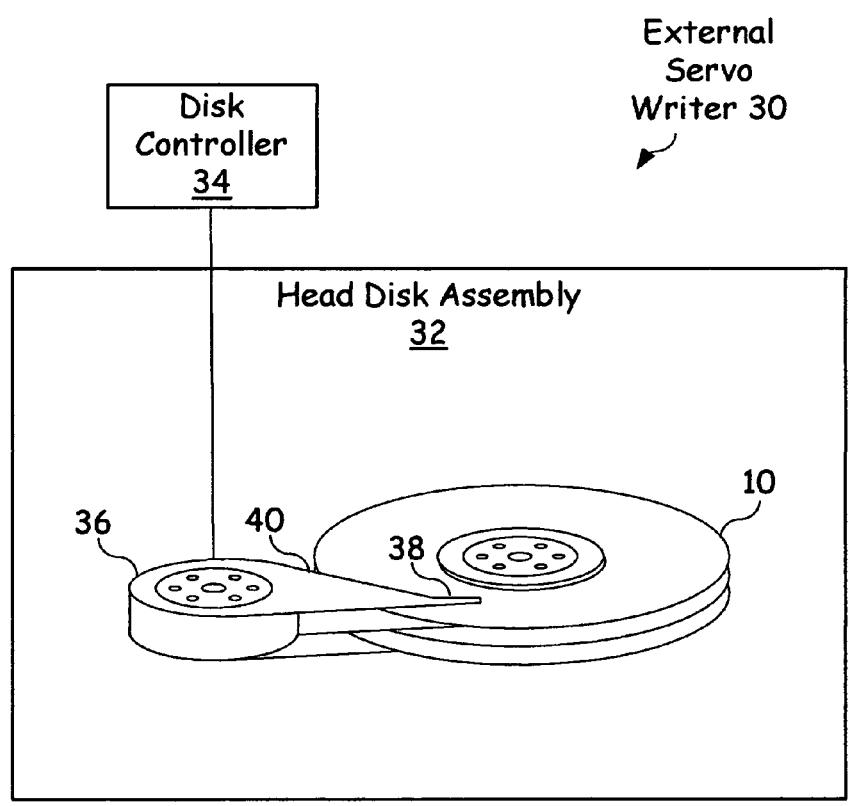
FIG. 2 is a system diagram of an external servo writer.

FIG. 2 is a system diagram of an external servo writer 30. External servo writer 30 includes a head disk assembly 32, Disk controller 34, actuator 36, and RW head 38 located at the distal end of arm 40. Disk controller 34 may determine the first magnetic reference pattern (servo pattern) to be written onto disk 10. Disk controller 34 may function as a disk controller operable to direct the positioning of a RW head 38 over disk 10 with the use of a precision positioning system such as, but not limited to a laser guided positioning system. Embodiments of the present invention eliminate the need of seed wedges. Seed wedges typically contain location information. By placing location information (i.e. track number) within a spiral sync mark (SSM), time and cost in the clean room precise servo-writing process can be reduced. Also, in case of any disturbance while servo-writing the final patterns, track number and wedge number can be easily recovered so the system may return to a lock state and the servo writing process can continue. This eliminates the prior need to start the process all over again. Additionally, this process is format efficient, and does not require writing extra patterns in the spirals. The accuracy of the process may be adjusted arbitrarily by tuning hardware and software detection parameters.

Embodiments of the present invention uses two or more SSM's to indicate track number and index position. The present invention is flexible in a sense that if there are only two SSM's available, index position can still be encoded onto each track. And if more SSM's are available, they are used such that center of track and index position are uniquely marked with the SSM's. Fault tolerance is improved where multiple track numbers can be written on each track and error detection codes can be applied on the track numbers. This is possible because no format overhead is required to write this extra information. Accurate track number tracking is possible even when the head is seeking from one track to the next because the track numbers across adjacent tracks can be gray coded as will be described with reference to FIGS. 8 and 9.

Figure 3:
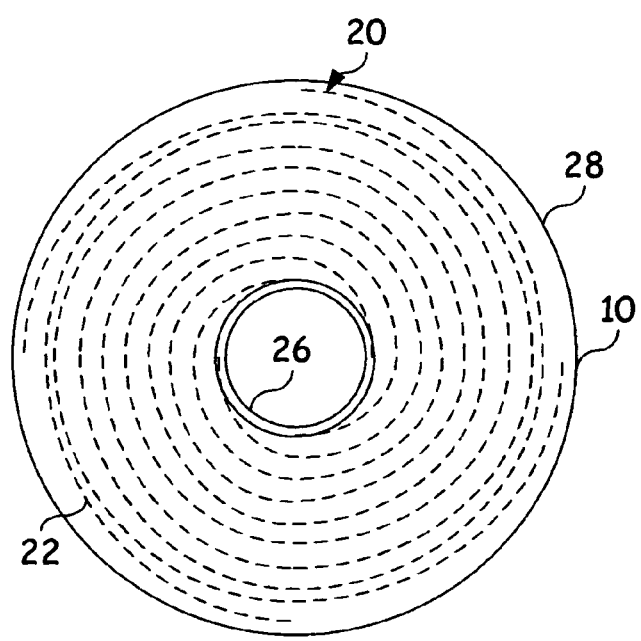
FIG. 3 depicts a disk which has had a first magnetic pattern written to the disk using external servo writer.
Figure 4:
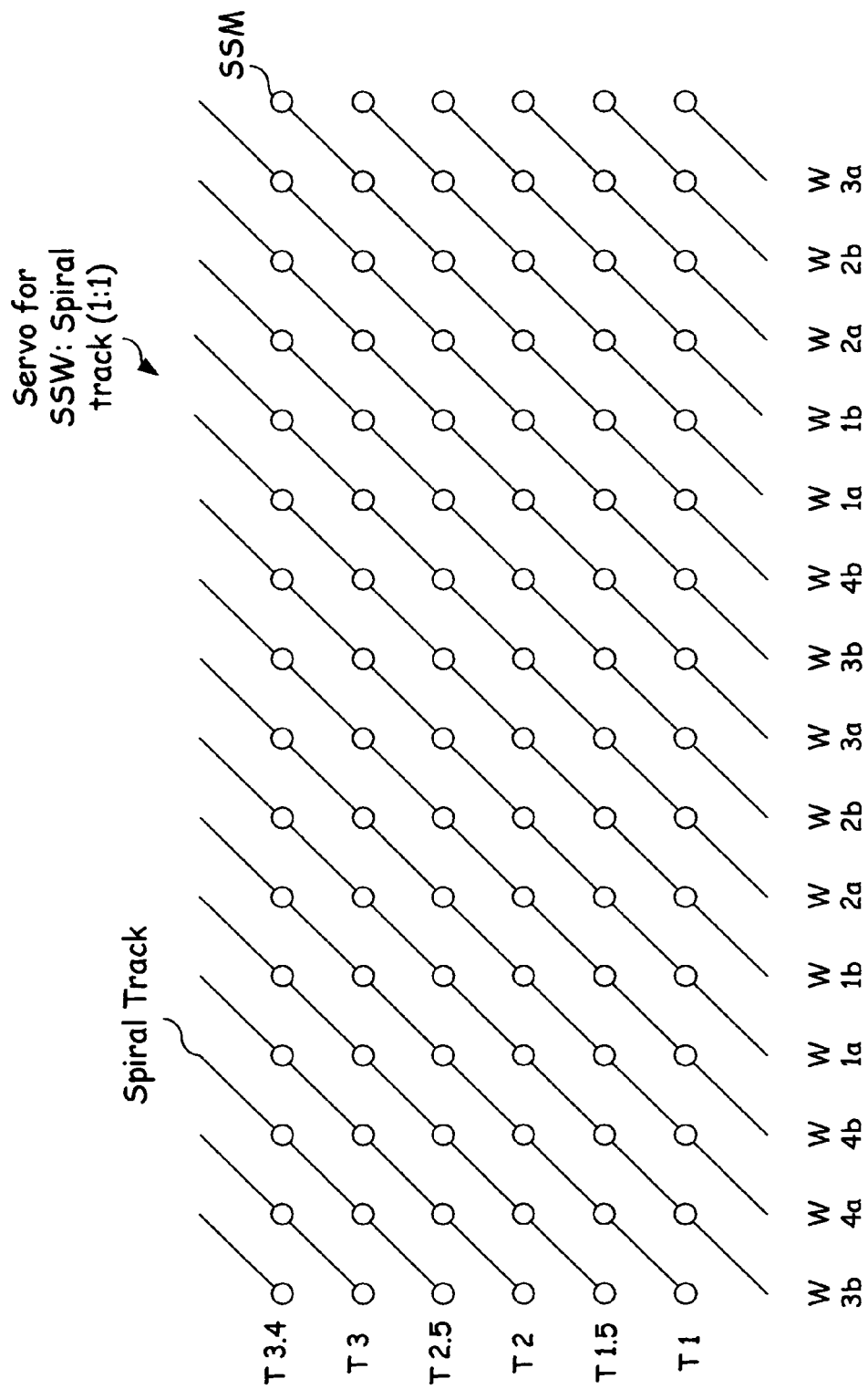
FIG. 4 depicts a spiral reference pattern.

FIG. 3 depicts a disk 10 which has had a first magnetic pattern 20 written to the disk using external servo writer 30. Here, first magnetic pattern 20 is depicted as a plurality of spirals 22 that each contains a further plurality of servo setter marks or spiral sync marks (SSM) 24 as depicted in FIG. 4. This pattern may be written either from the inner diameter 26 to outer diameter 28 or from outer diameter 28 to inner diameter 26.

Figure 1:
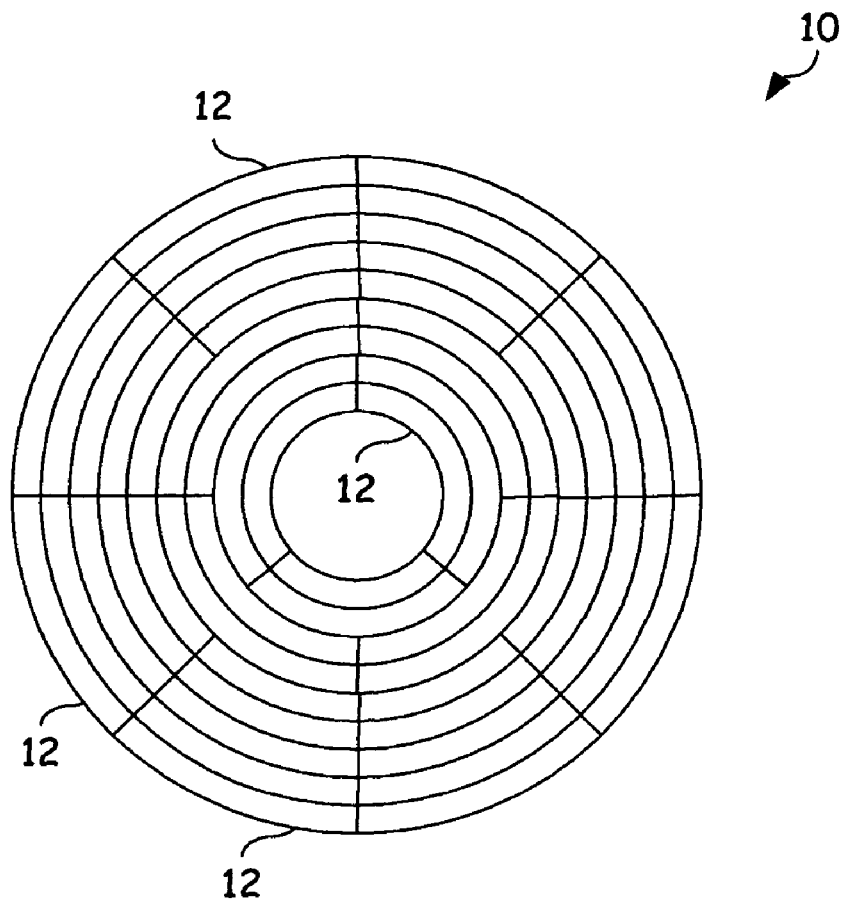
FIG. 1 depicts a pattern of radially-spaced concentric data tracks within the magnetic media of a disk.

Each spiral pattern 20, as well as the slope of each spiral pattern, is selected such that the external servo writer can process disk 10 in a shorter period of time as compared to the time required to write a complete set of concentric tracks as depicted in FIG. 1. Additionally, the spiral reference pattern 20 selected should avoid or minimize positioning errors inherent in writing the spiral reference pattern or other first magnetic pattern on disk 10. Disk 10 may be removed from the external servo writer 30 and placed within a conventional hard disk drive 50 to create the physical structures depicted in FIG. 1 (i.e. tracks and sectors) on the disk.

Most SSW processes utilize a clock or timing circuit to compare the football to football (FTF) time between spirals, wherein a position error may be generated based on the error between the expected time between spirals and the FTF. This requires an accurate clock circuit to provide a timing signal with which to determine the timing error. Embodiments of the present invention are able to eliminate the need for the clock circuit by measuring both the FTF and a track center error (TCE) wherein the TCE represents a phase error. The velocity signal and phase error signal when combined allow the disk controller to accurately determine the position of the RW head given knowledge of the spiral servo pattern on the disc.

Figure 5:
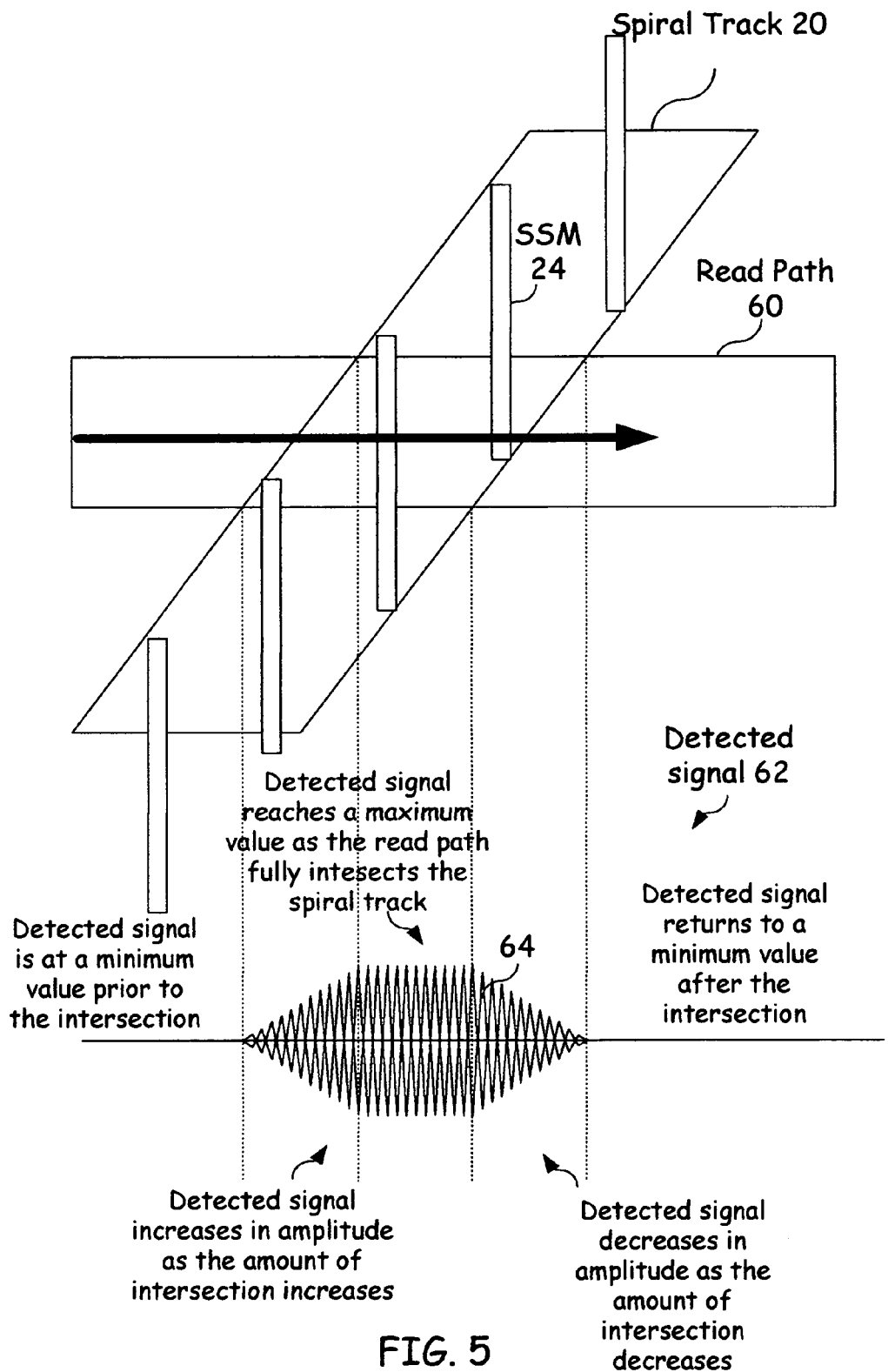
FIG. 5 illustrates how the amplitude of a detected signal changes as the read path intersects the spiral track.
Figure 6:
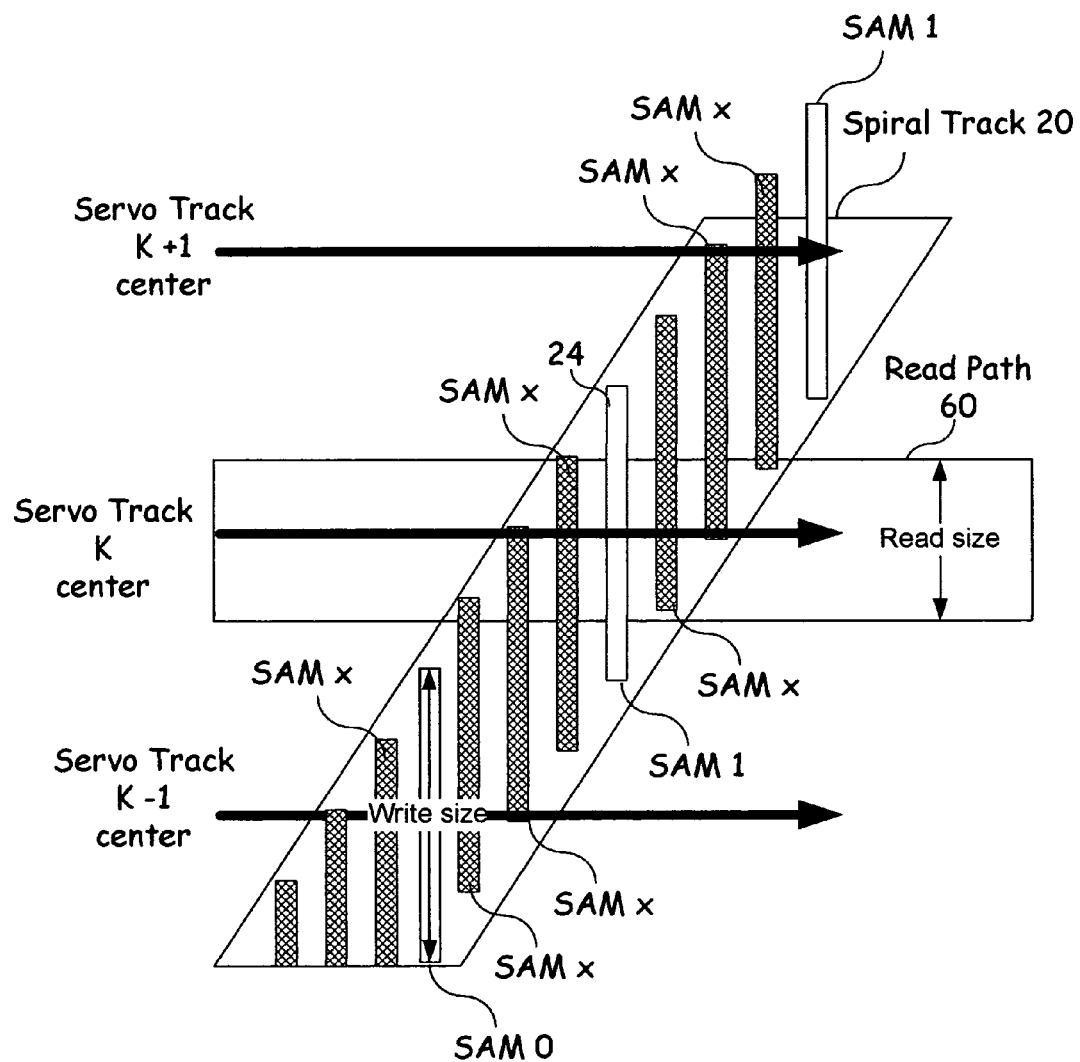
FIG. 6 depicts how gray code (i.e. track number information) may be embedded within a spiral track in accordance with an embodiment of the present invention.

FIG. 5 and FIG. 6 describe various timing components that may be measured as the read path 60 intersects a spiral track 20. As the RW head follows the read path 60, the read path 60 intersects a number of spirals tracks 20 written to the disk. The amplitude of the signal detected by the RW head is shown as detected signal 62. Prior to the intersection of the read path and the spiral track, the amplitude of the detected signal is a minimal or nominal value. As read path 60 intersects the spiral track 20, the amplitude of the detected signal 62 increase until the read path is located entirely over the spiral track. At this point, the amplitude of the detected signal will reach a maximum value. This maximum value may continue until the read path coverage of the spiral track decreases. During this time, the amplitude of the detected signal 62 returns to the minimal or nominal value. These amplitude changes within detected signal 62 are shown in the timing diagram beneath the intersection of the read path for the spiral track. The amplitude of detected signal 62 forms a diamond or football-like shape 64.

To determine the phase error associated with the read path, it is important to determine the track center error (TCE) which is the difference in time and location and between the SSM located within the spiral track and the center of the diamond or football-like shape 64 formed as the read path intersects the spiral track. Ideally, the SSM should be detected at the center of the diamond or football-like shape 64. FIG. 5 provides a timing diagram that first shows the amplitude of the detected signal 62 wherein a diamond or football-like shapes 64 are formed as the read path 60 intersects a series of spiral tracks 20. Located within these spiral tracks are SSMs 24. These SSMs provide an additional signal that may be used to determine the phase error. This phase error is the difference between the center of the diamond or football-like shapes 64 and the location of the detected SSMs.

One embodiment of the present invention may utilize a simple, robust, flexible method with no format overhead to record and detect track number and index position to enhance efficiency of SSW. Typically, there are two spirals per wedge to wedge. So, the number of spirals is twice the number of wedges. The RW head usually detects and locks on the even or the odd set of spirals and switches between the two sets when appropriate. When the RW head on a track intercepts a spiral, the read back signal looks like a football shape profile as shown in FIG. 5. Typically, there are a number of SSM's and spiral bursts within one football profile.

Figure 7:
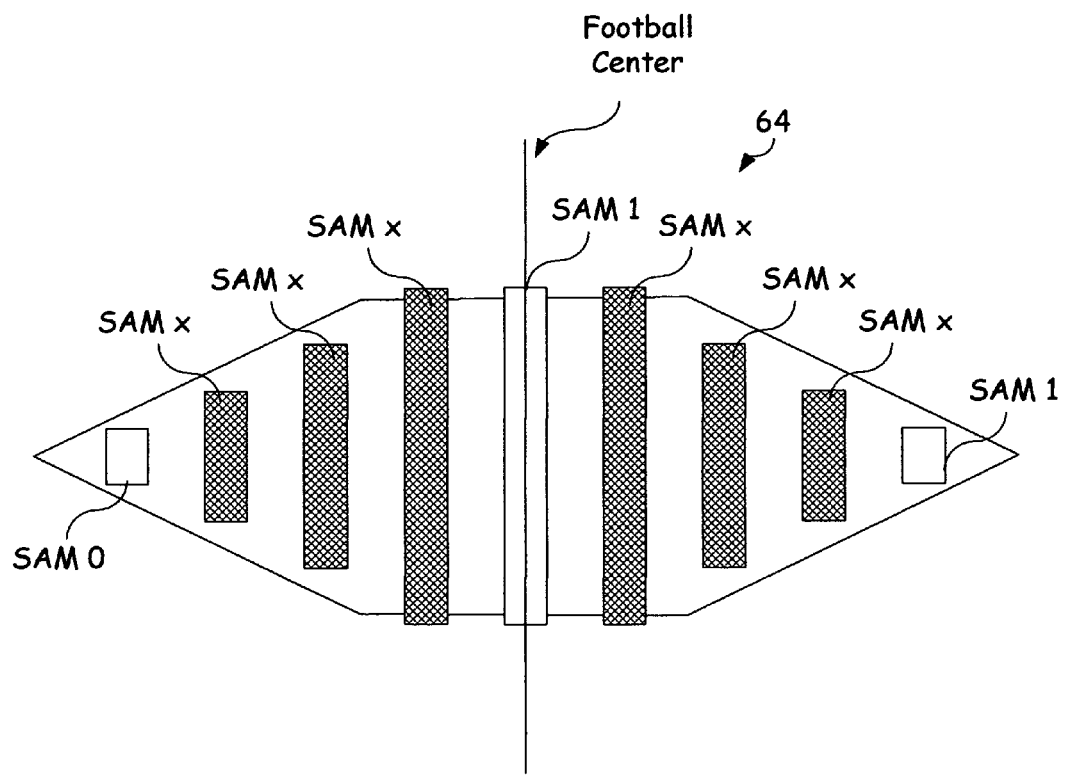
FIG. 7 depicts the read back signal containing gray code information located within a football in accordance with an embodiment of the present invention.

In FIG. 6, two SSM patterns are designated to represent a "1" (SAM1) and a "0" (SAM0). Track number is recorded 1 bit per spiral. An N-bit track number is recorded on N spirals in the even set and the odd set. So no matter which set the head is using, the track number can be read. As shown in FIG. 7, the SSM in the center of the football 64 indicates "1" or "0" for the track number bit. Even if the head is off track by a certain amount, the adjacent SSM is read but it is still correct. When there are three available SSM's, two SSM patterns are again designated as "1" (SAM1) and "0" (SAM0) and are written at the track centers. The third SSM is called SAMx and are written at all the locations which are not track centers. The SSM in the center of the football indicates a "1" or a "0" for the track number bit. If the head is off track by a certain amount, the SAM1 or SAM0 pattern will move forward or backward in the football but it still indicates the track number bit correctly. The advantage of this scheme is that the track center is marked and in the read back football signal, the amount of off track can be calculated from the distance of SAM1 or SAM0 from the center of the football. This also makes the timing error calculation simpler as there is no ambiguity which SSM should be used to derive the timing error signal.

Figure 9:
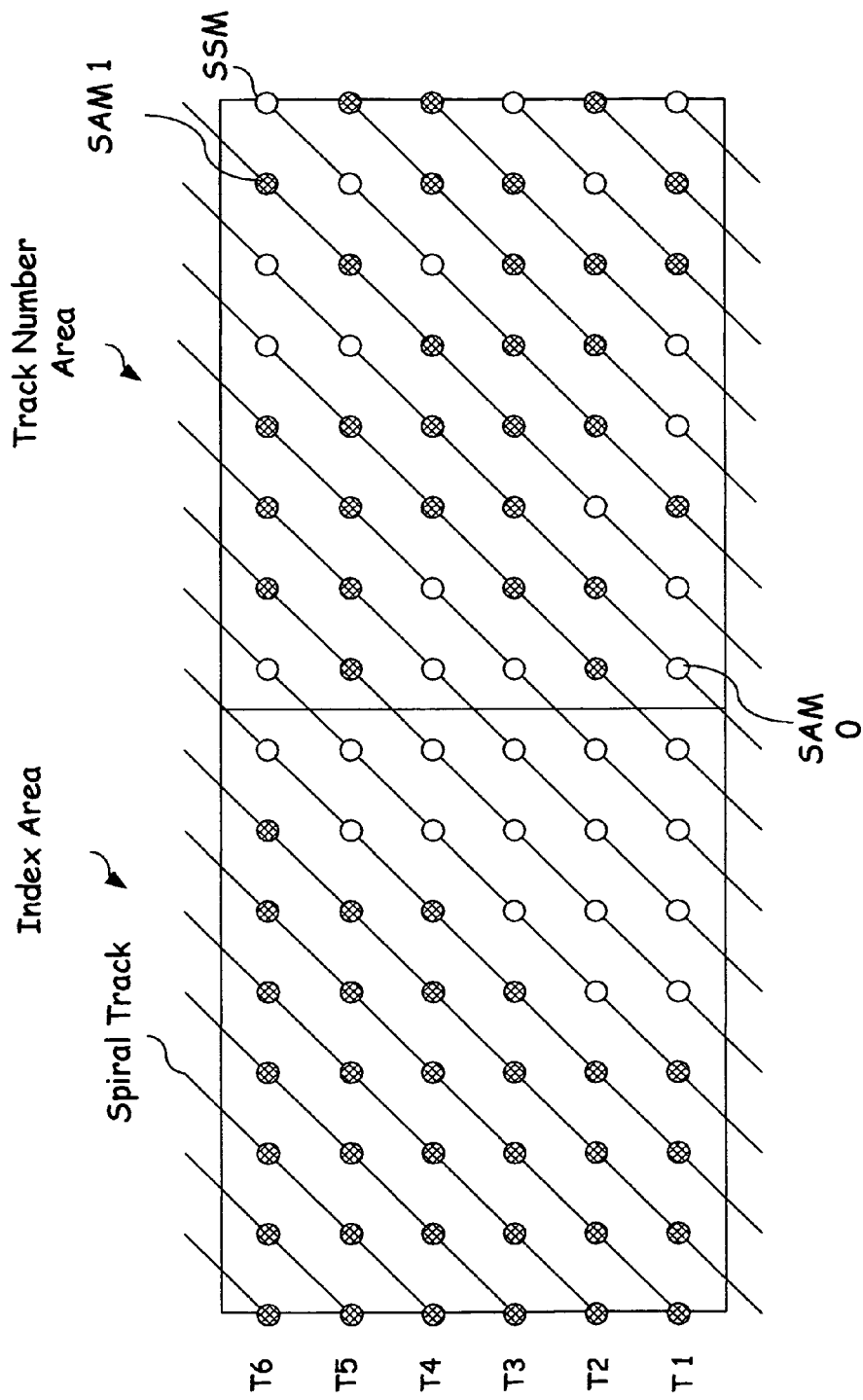
FIG. 9 depicts a pattern of bits used to indicate gray code information in accordance with an embodiment of the present invention.

In order to know precisely where the first bit of track number is, a starting pattern preceding the track number is recorded. This pattern is illustrated in FIGS. 8 and 9. FIG. 8 depicts a pattern of bits used to indicate gray code information in accordance with an embodiment of the present invention while FIG. 9 depicts adjacent tracks containing gray coded information in accordance with an embodiment of the present invention. This starting pattern located within the index area is designed to be an invalid track number and will never occur inside the gray or track number area. A pattern of 41 bits (40 "1" and 1 "0") may be chosen in one embodiment as the starting pattern as the track number will never exceed 40 bits. If a forth SSM is available, it can be used as index mark to indicate angular position. If it is not available, a 42 bit starting pattern (41 "1" and 1 "0") is used as index pattern.

Adjacent track numbers can be gray coded so that when the head is seeking from one track to the next, there is at most one track number bit error. This single bit error can be easily corrected by either reading the extra track number on a single track or by using the track number of previous track. Every four track lines up in the radial direction. So for a group of four tracks, the gray coded track numbers of the first and second tracks and the gray coded track numbers of the second and third tracks line up in the same direction. The gray coded track numbers of the third and fourth tracks line up in the opposite direction. The net effect is that all the track numbers stay on the same band from ID to OD. This makes index pattern writing and reading easy.

On a track number bit level, the length of the SSM and the SSM hardware detection tolerance can be optimized to trade off false detection versus miss detection. For the whole track number, parity code or error correcting code like Hamming code can be applied to enhance robustness of track number detection. Multiple track numbers are written on each track so the system can make use of this redundant information to enhance robustness.

Figure 10:
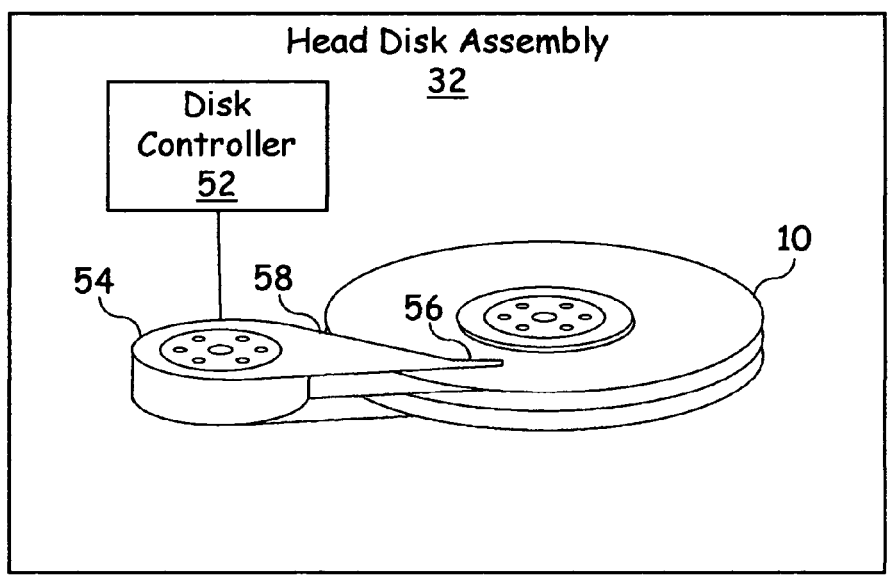
FIG. 10 depicts a hard disk drive that includes a control circuitry, a hard disk, an actuator, a RW head and positioning arm in accordance with an embodiment of the present invention.
Figure 11:
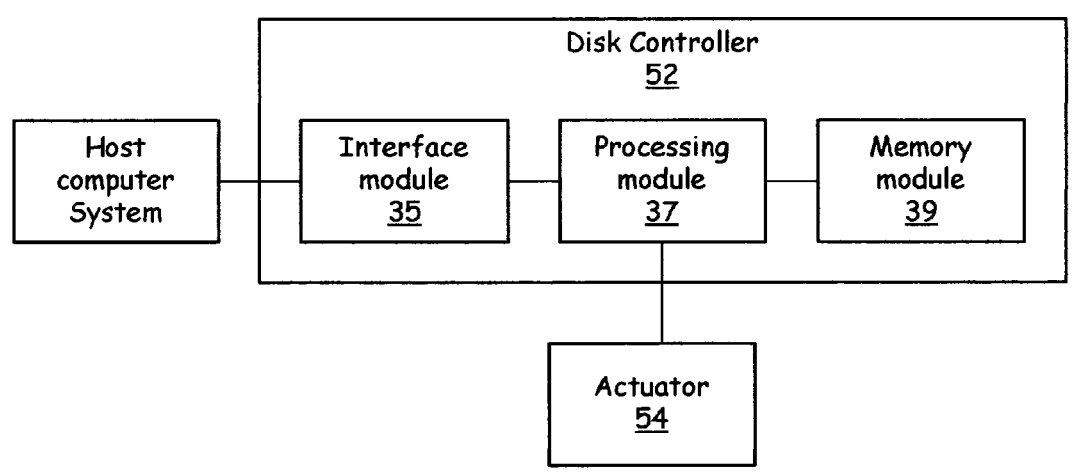
FIG. 11 is a functional block diagram of a disk controller in accordance with an embodiment of the present invention.

FIG. 10 depicts a hard disk drive 50 that includes disk controller 52, hard disk (magnetic media) 10, actuator 54, RW head 56 and positioning arm 58. Disk controller 52 as shown in FIG. 11 includes an interface module 35, processing module 37 and memory module 39. Disk Controller 52, which may be implemented as an integrated circuit or series of discrete components, may interface with a host computer system and direct the operation of the other internal components within hard disk drive 50.

Processing module 37 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory module 39 may take the form of a single memory device or a plurality of memory devices. Such a memory device may be a read-only memory, random access memory, volatile memory, non-volatile memory, static memory, dynamic memory, flash memory, cache memory, and/or any device that stores digital information. Note that when the Disk controller 52 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Processing module 37 stores and executes operational instructions corresponding to at least some of the steps and/or functions illustrated with reference to FIGS. 12 and 13.

Disk controller 52 may compute a position error for RW head 56 with respect to a circular trajectory in response to the first reference magnetic pattern 20. This pattern contains track number information. More specifically, control circuitry 52 is operable to determine the position of the RW head 56 by sensing both the velocity and phase of RW head 56 relative to SSMs 24 contained within the first magnetic reference pattern. In this method, the hard disk drive controller generates a FTF error signal and a TCE signal. These two signals provide a feedback signal used to control velocity and phase of RW head 56 relative to SSMs 24. Therefore enabling or facilitating the exact positioning of RW head 56 relative to the first magnetic pattern. Since this methodology uses the SSMs of the first reference pattern to position RW head 56 when defining the second magnetic reference pattern, cumulative positioning errors are avoided and the need for seed wedges is reduced or eliminated. These cumulative positioning errors occur when the RW head is positioned during the SSW process based on previously written servo tracks. Positioning the RW head based on the SSM during the SSW process reduces or eliminates the positioning error of the RW head during the SSW process, resulting in a more accurate positioning of the servo tracks on the drive which will ultimately result in a higher quality end product at a lower cost.

Figure 12:
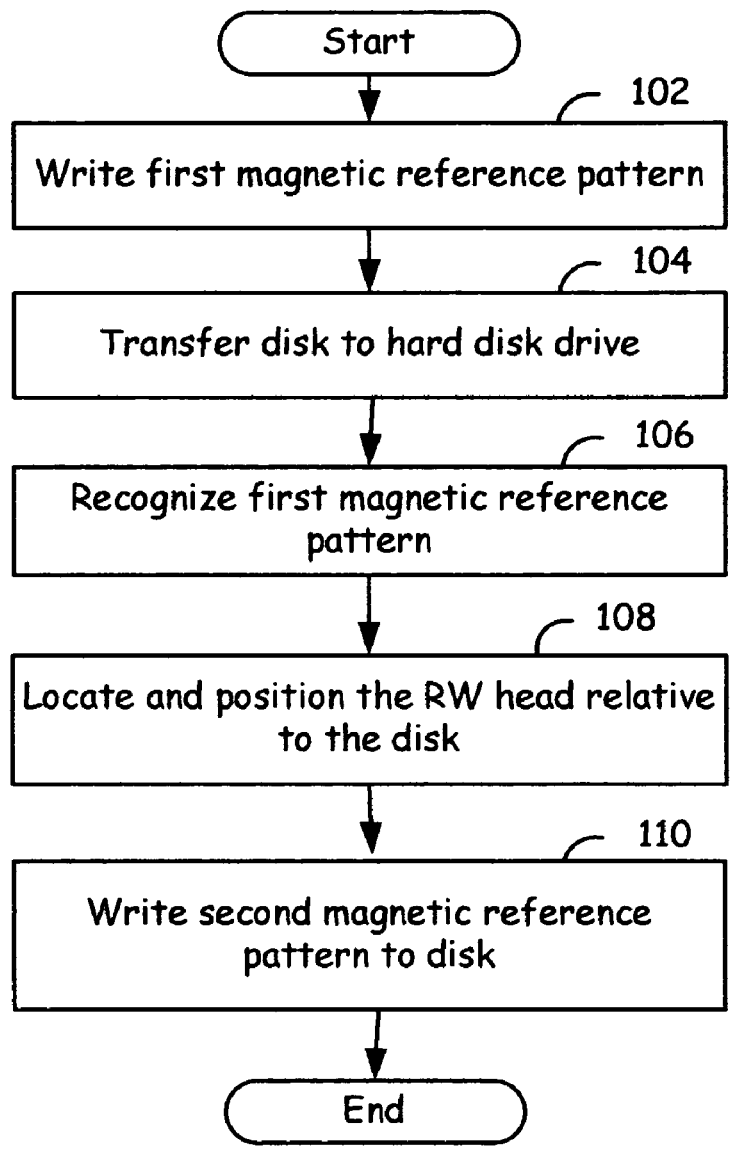
FIG. 12 provides a logic flow diagram illustrating a method operable to define magnetic reference patterns within magnetic media in accordance with an embodiment of the present invention.

FIG. 12 provides a logic flow diagram in accordance with one embodiment of the present invention. This process involves first writing a first magnetic reference pattern, such as a spiral reference pattern containing gray coded SSMs, using a servo writer in step 102. After this first magnetic pattern has been written to a disk in the servo writer, the disk may be transferred to a hard disk drive in step 104. The control circuitry or hard disk controller within the hard disk drive will recognize the first magnetic reference pattern and track locations as evidenced by gray coded SSMs in step 106. Control circuitry is operable to direct the positioning of the RW head within the hard disk drive based on the first magnetic reference pattern. This first magnetic reference pattern may, for example, be a spiral reference pattern that includes a number of SSM marks which will be used to accurately determine the position of the RW head relative to the disk in step 108. The RW head within the hard disk drive is used to write a second magnetic pattern to the disk in step 110. This second magnetic reference pattern may include a series of radially-spaced concentric tracks and sectors within the tracks.

The positioning of the RW head during the writing of the second magnetic reference pattern to the disk may be determined based on the velocity and phase between the RW head and the SSMs of the first magnetic reference pattern. The second magnetic reference pattern defines sectors and tracks within the disk wherein data may be stored and organized within the sectors and tracks of the disk. Additionally, the first magnetic reference pattern may be overwritten by the second magnetic reference pattern during this process. Should an error or disturbance occur while servo-writing the final patterns, track number and wedge number can be easily recovered so the servo writing process can continue by determining location from the gray coded SSMs. There is no need to start all over again. The present invention is format efficient as it does not require writing extra patterns in the spirals.

Figure 13:
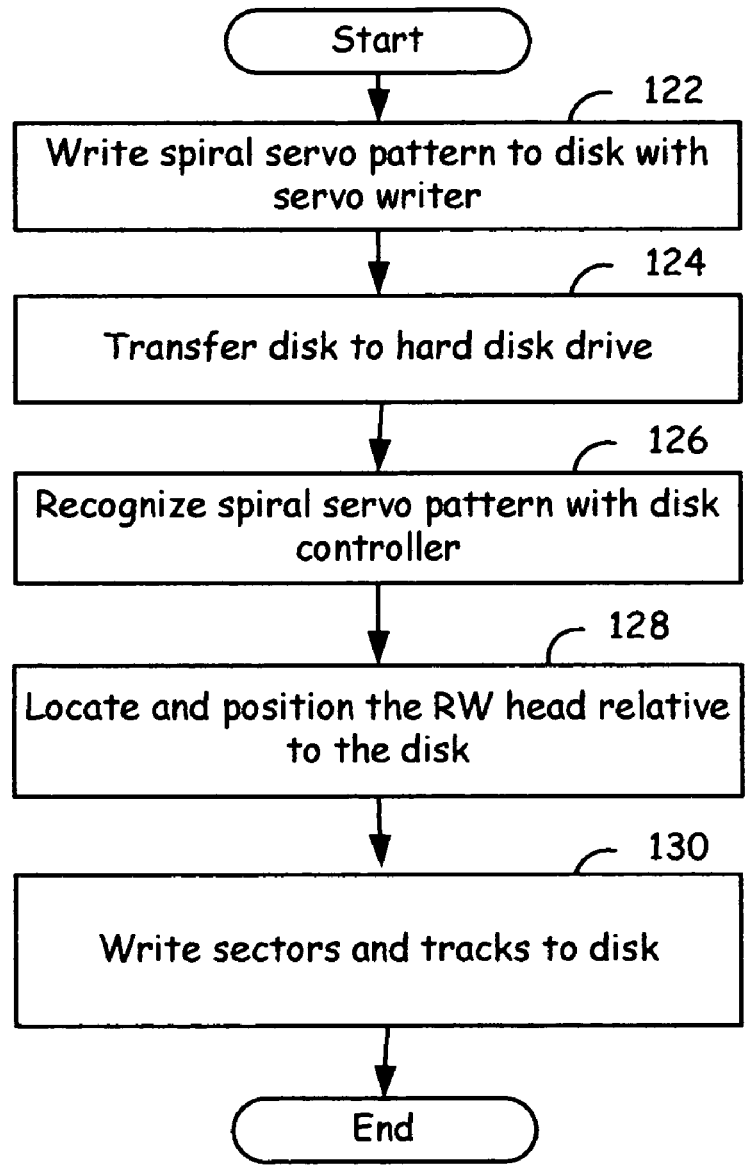
FIG. 13 provides a logic flow diagram illustrating a method operable to define sectors and tracks within magnetic media in accordance with an embodiment of the present invention.

FIG. 13 provides a second logic flow diagram of a process operable to define sectors and tracks within a magnetic disk. This involves writing a spiral reference pattern to the disk with a servo writer in step 122. This disk is then transferred from the servo writer to a hard disk drive in step 124. The disk controller of the hard disk drive is operable to recognize the spiral reference pattern and gray coded SSMs in step 126. In step 128, the hard disk drive controller is then operable to locate and direct the positioning of the RW head within the hard disk drive based on the relative velocity and phase between the RW head and SSMs within the spiral reference pattern. By accurately positioning the RW head, sectors and tracks may be written to the disk in step 130. During this writing process, the RW head location is determined based on the velocity and phase between the RW head and the first magnetic reference pattern. This avoids cumulative errors previously associated with SSW processes that determined the location of a subsequent sector and tract based on a previously defined sector and tract.

In summary, the present invention provides a method of generating magnetic reference patterns on a disk or other magnetic media without the need for seed wedges. This involves writing a first magnetic reference pattern to the disk with a servo writer. The disk may then be transferred to a hard disk drive. Control circuitry within the hard disk drive may recognize the first magnetic reference pattern and then position a RW head within the hard disk drive based on the first magnetic reference pattern. As the RW drive is accurately positioned based on the first magnetic reference pattern a second magnetic reference pattern may be written to the disk using the RW head. The RW head location is determined based on the velocity and phase between the read-write head and SSM contained within the first magnetic reference pattern.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions, and alterations can be made hereto without departing from the spirit and scope of the invention as described by the appended claims.

What is claimed is:

1. A method operable to generate magnetic reference patterns on a disk, comprising:

recognizing a first magnetic reference pattern containing embedded location information on the disk, wherein the hard disk drive is operable to position a read write (RW) head within the hard disk drive, based on the embedded location information contained in a spiral sync mark (SSM); and writing a second magnetic reference pattern to the disk using the RW head within the hard disk drive, wherein the RW head location is determined based on velocity and phase error between the RW head and the SSM which are based on a football to football (FTF) indication and a track center error (TCE) indication, wherein the phase error is determined by a difference between a center of the FTF indication and a detected SSM and in which the detected SSM includes a track number bit for identifying a particular track.

2. The method of claim 1, wherein the hard disk drive is operable to organize data to disk based on the second magnetic reference pattern.

3. The method of claim 1, wherein the second magnetic reference pattern define sectors and tracks within the disk.

4. The method of claim 1, wherein the first magnetic reference pattern is written from an inner diameter of the disk towards an outer diameter of the disk.

5. The method of claim 1, wherein the first magnetic reference pattern is written from an outer diameter of the disk towards an inner diameter of the disk.

6. The method of claim 1, wherein the first magnetic reference pattern is overwritten by the second magnetic reference pattern.

7. A hard disk drive, comprising:
a disk controller;
at least one read write (RW) head;
at least one disk having a first magnetic reference pattern containing embedded location information contained in a spiral sync mark (SSM), wherein the disk controller is operable to write a second magnetic reference pattern to the at least one disk with the at least one RW head, wherein a position of the at least one RW head within the hard disk drive is based on velocity and phase error between the at least one RW head and the SSM which are based on a football to football (FTF) indication and a track center error (TCE) indication, wherein the phase error is determined by a difference between a center of the FTF indication and a detected SSM and in which the detected SSM includes a track number bit for identifying a particular track.

8. The hard disk drive of claim 7, wherein the hard disk drive is operable to organize data to the at least one disk based on the second magnetic reference pattern.

9. The hard disk drive of claim 7, wherein the first magnetic reference pattern is written by a servo writer.

10. The hard disk drive of claim 9, wherein the first magnetic reference pattern is written from an inner diameter of the disk towards an outer diameter of the disk.

11. The hard disk drive of claim 9, wherein the first magnetic reference pattern is written from an outer diameter of the disk towards an inner diameter of the disk.

12. The hard disk drive of claim 7, wherein the first magnetic reference pattern is overwritten by the second magnetic reference pattern.

13. A method operable to define sectors and tracks on a disk, comprising:
writing a first magnetic reference pattern having embedded location information contained in a spiral sync mark (SSM) to the disk with a servo writer;
transferring the disk to a hard disk drive;
recognizing embedded location information on the disk, wherein the hard disk drive is operable to position a read write (RW) head within the hard disk drive, based on velocity and phase error between the RW head and the SSM which are based on a football to football (FTF) indication and a track center error (TCE) indication, wherein the phase error is determined by a difference between a center of the FTF indication and a detected SSM and in which the detected SSM includes a track number bit for identifying a particular track; and
writing a second magnetic reference pattern to the disk using the RW head within the hard disk drive, wherein the RW head location is determined based on the embedded location information, and wherein the second magnetic reference pattern defines sectors and tracks on the disk.

14. The method of claim 13, wherein the hard disk drive is operable to organize data to the disk based on the second magnetic reference pattern.

15. The method of claim 13, wherein the servo writer comprises a laser positioning system operable to precisely locate and position a servo writer RW head, wherein the servo writer RW head is operable to write the first magnetic reference pattern to the disk.

16. The method of claim 13, wherein the first magnetic reference pattern is written from an inner diameter of the disk towards an outer diameter of the disk.

17. The method of claim 13, wherein the first magnetic reference pattern is written from an outer diameter of the disk towards an inner diameter of the disk.

* * * * *